(No Model.) 2 Sheets—Sheet 1.

A. W. KRON MILLER & G. C. RUBY.
KITCHEN CABINET.

No. 531,956. Patented Jan. 1, 1895.

Witnesses:
A. H. Baukunnister
M. P. Smith

Inventors:
Alfred W. Kron Miller
and George C. Ruby
by Higdon and Higdon and Longan
Attys.

(No Model.) 2 Sheets—Sheet 2.
A. W. KRON MILLER & G. C. RUBY.
KITCHEN CABINET.
No. 531,956. Patented Jan. 1, 1895.
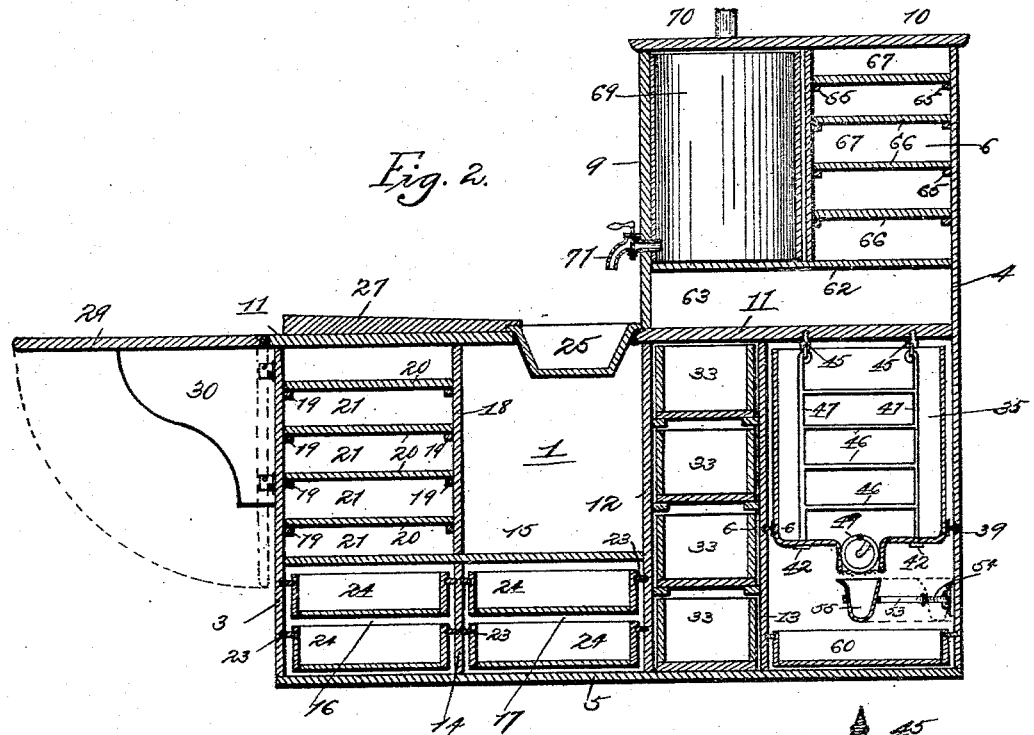
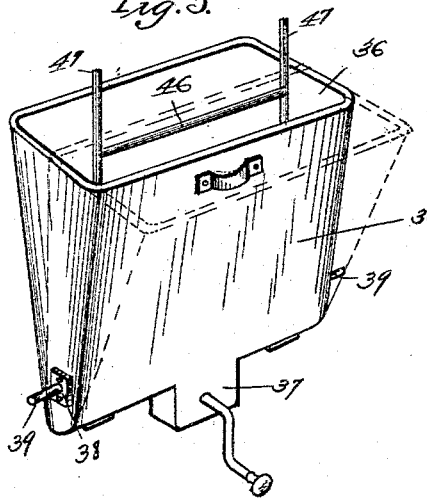
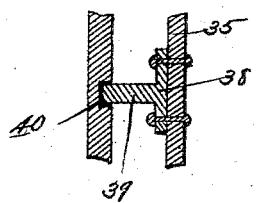

UNITED STATES PATENT OFFICE.

ALFRED W. KRON MILLER AND GEORGE C. RUBY, OF ST. LOUIS, MISSOURI.

KITCHEN-CABINET.

SPECIFICATION forming part of Letters Patent No. 531,956, dated January 1, 1895.

Application filed July 30, 1894. Serial No. 518,929. (No model.)

*To all whom it may concern:*

Be it known that we, ALFRED W. KRON MILLER and GEORGE C. RUBY, of the city of St. Louis, State of Missouri, have invented certain new and useful Improvements in Kitchen-Cabinets, of which the following is a full, clear, and exact description, reference being had to the accompanying drawings, forming a part hereof.

Our invention relates to a kitchen cabinet, and has for its object the combining and arranging of various parts so that a compact and complete cabinet will be formed.

A further object of our invention is to combine a wash basin or sink and a drain-board into said sink, and a water reservoir or tank with a kitchen cabinet.

A further object of our invention is to construct a kitchen cabinet that will possess superior advantages in point of simplicity, durability and general efficiency.

Our invention consists in a rectangular frame work, an upright casing on one end of said frame work, a series of drawers and shelves suitably located within said frame work, a water reservoir or tank located in the upright frame work, a wash basin and drainboard located on top of the main frame work, and a flour bin and sifter located near one end of the main frame work.

Our invention further consists in certain novel features of construction, combination and arrangement of parts, hereinafter specified, pointed out in our claims and illustrated by the accompanying drawings, in which—

Figure 1:
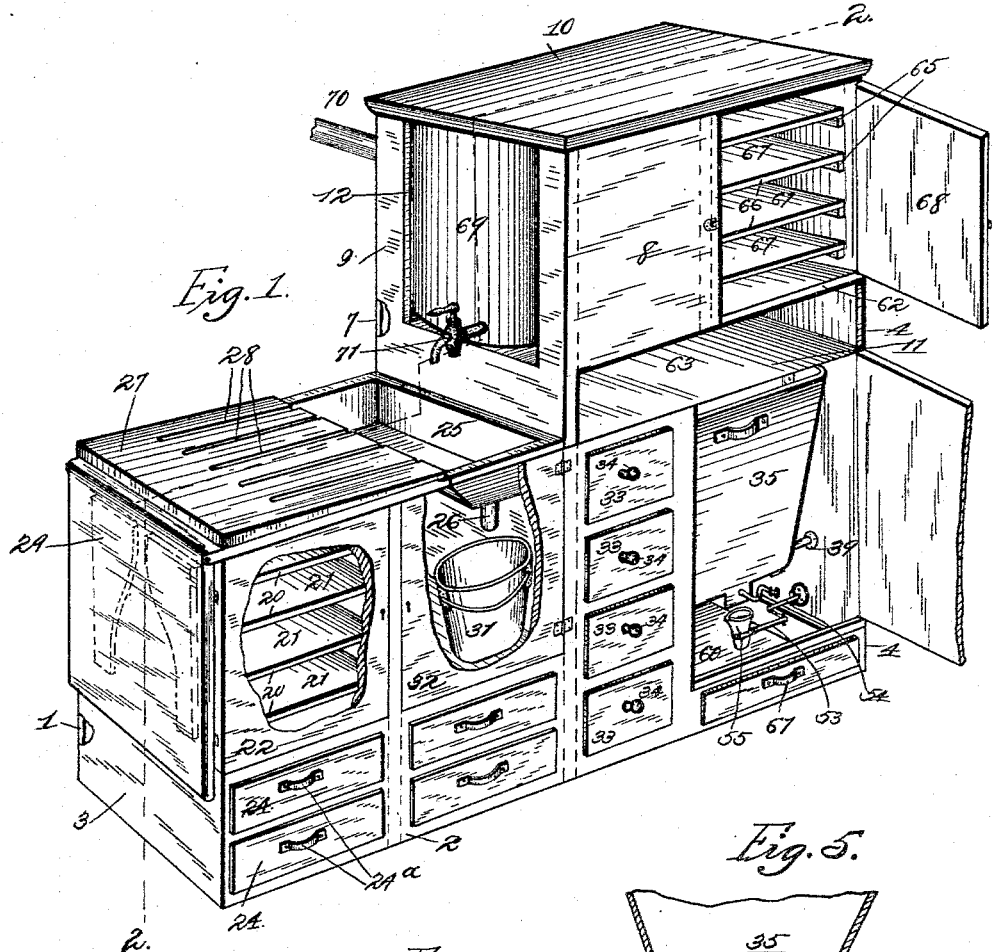
Figure 4:
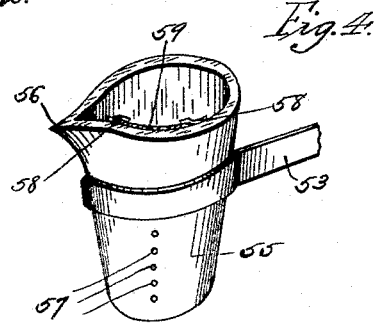
Figure 5:
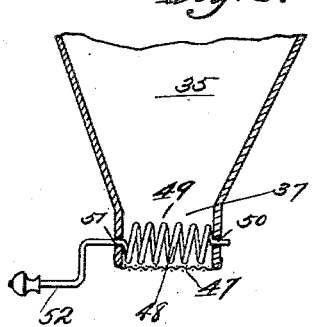

Figure 1 is a perspective view of our complete cabinet, parts being broken away therein to more clearly illustrate the interior portion of the same. Fig. 2 is a longitudinal sectional view on the line 2—2 of Fig. 1. Fig. 3 is a view in perspective of the flour bin or receptacle, the same being detached from the cabinet. Fig. 4 is a view in perspective of the measuring vessel we use in carrying out our invention. Fig. 5 is a cross-sectional view of the lower end of the flour bin or receptacle, and showing the sifting device in position therein. Fig. 6 is an enlarged cross-sectional view on the line 6—6 of Fig. 2. Fig. 7 is a view in perspective of one of a pair of hooks we make use of in suspending the flour bin or receptacle.

In the construction of the cabinet as shown, 1 and 2 represent respectively the rear and front walls of the cabinet, the same being rigidly fixed to the end-walls 3 and 4 and bottom 5.

The end wall 4 is made considerably higher than the end wall 3 and forms the end wall for the upright portion 6 of the cabinet, said upright portion 6 being constructed of the rear and front walls 7 and 8, end wall 9 and top 10. A horizontal partition 11 forms the bottom of the upright cabinet 6 and the top for the lower cabinet, the same being securely positioned upon the end walls 3 and 4.

Directly beneath the end wall 9 of the upright cabinet and positioned between the rear and front walls 1 and 2 is a vertical partition 12, and at a point approximately one-third of the distance toward the end wall 4 is a similar vertical partition 13.

At a point midway between the partition 12 and the end wall 3 and extending transversely of the lower portion of the cabinet is a partition 14, the same being approximately one-third as high as is the end wall 3 and the partition 12. Lying immediately upon this partition 14 and secured to the end wall 3 and partition 12 is a horizontal partition 15. Thus are formed the compartments 16 and 17. Immediately above the vertical partition 14 and resting upon the horizontal partition 15 is a vertical partition 18, the same extending to the top 11.

Directly opposite each other on the inner side of the partition 18 and end wall 3 are secured, in any suitable manner, cleats 19 on which are placed the horizontal partitions 20, thus forming a series of compartments 21, the same being uniform in size. A door 22 constructed in the front wall 2 is adapted to close this series of compartments 21. Mounted to slide in and out upon the cleats 23 secured to the inner surfaces of the partitions 12 and 14 and the end wall 3 are drawers 24, the same being uniform in size and provided on their exposed ends with drawer pulls 24$^a$. These drawers occupy the compartments 16 and 17.

Located transversely in the top 11 immediately outside the end wall 9 of the upright portion of the cabinet is a metallic sink or wash basin 25, the same being provided with an outlet, such as 26. Mounted upon the top 11 and inclining from the end wall 3 is a drainboard 27, the same being provided with the grooves or drains 28.

Hinged to the end of the top 11 is a rectangular board 29, the same being adapted to be used as a kneading or dough board. This board 29 normally occupies a vertical position, or as that shown in Fig. 1, it being supported in a horizontal plane by means of folding braces 30, the same being hinged to the outer surface of the end wall 3.

Within the compartments between the partitions 12 and 18 and immediately beneath the sink 25 is adapted to be placed a removable receptacle, such as 31. A door 32 closes this compartment.

Mounted to slide horizontally upon cleats secured to the inner faces of the partitions 12 and 13 is a series of drawers 33, the same being provided on their outer ends with knobs or drawer pulls 34. Located in the upper portion of the compartment between the partition 13 and the end wall 4 is a flour bin or receptacle 35, the same being preferably formed of sheet metal with the open top end 36, tapering toward the bottom and there provided with the spout 37. Riveted on each side of the lower end of this flour bin are plates 38 provided with outwardly extending bearings 39 which are adapted to enter recesses 40 formed in the partition 6 and end wall 4.

Vertical hangers 41, provided on their lower ends with heads 42, extend upwardly through the bin or receptacle 35 and have formed on their upper ends hooks 43. These hooks are engaged by the downwardly pending links 44 of the headed portions of screw-bolts 45 that enter the under side of the top 11. Connecting the vertical hangers 41 are horizontal rods 46.

Covering the bottom of the spout 37 is a section of wire mesh or reticulated material 47. Mounted transversely in the spout 37 and immediately above this portion of reticulated material is a sifting device 48, the same being constructed of a single length of wire formed into the coil 49, bearings 50, 51 and crank-handle 52.

Adapted to swing upon hinged arms 53 and 54 (said arm 54 being mounted upon the inside of the end wall 4) is a measuring cup 55, the same being constructed of sheet metal or analogous material, provided with the spout 56 and vertical line of apertures 57. Mounted upon the inside of this cup, covering the apertures 57, and held therein by means of retaining strips 58, is a strip of glass, or other transparent material 59. Occupying the bottom of the compartment in which the flour bin is located is a drawer 60, the same being provided on its outer end with the drawer pull 61.

Positioned transversely between the end 9 and the end 4 of the upright portion 6 of the cabinet, is a horizontal partition 62. Thus is formed between the top 11 and the partition 62 a compartment 63 which is left open in front.

A vertical partition 64 is positioned midway between the ends 9 and 4 and immediately upon the horizontal partition 62. Mounted upon oppositely positioned cleats 65 on the inner faces of the partition 64 and end 4 is a series of horizontal partitions 66, thus forming the compartments 67 that are closed in front by the hinged door 68. Mounted in the compartment formed between the partition 64 and the end wall 9 of the upright partition 6 of the cabinet is a water reservoir or tank 69, the same being provided with an inlet pipe 70 and faucet 71, said faucet projecting over the sink or wash basin 25. The end 9 may be left open, as indicated by 72.

Various household articles, and those especially used in the kitchen for culinary purposes are stored in the various drawers and compartments. The soiled dishes, &c., may be placed in the sink or wash basin 25 and water emptied therein by means of the faucet 71 from the tank 69. The dishes when washed are to be placed upon the drain-board 27 and there allowed to drain until dried in the usual manner. The water from the sink 25 is discharged through the pipe 26 into the receptacle 31, and from thence removed when desired.

Should the flour, meal, or other commodity, in the bin or receptacle 35 become packed or hardened, it can easily be broken and dislodged by oscillating said bin or receptacle back and forth a number of times. This breaking and dislodgment is accomplished by the action of the hangers 41 and cross-rods 46.

When it is desired to use a portion of the flour or meal within the receptacle, the measuring cup 55 is swung to a point immediately below the spout 37 and the crank-handle 52 of the sifting device 49 rotated. This will agitate the flour or meal in the lower portion of the receptacle and cause same to be sifted through the reticulated material 57 and into the measuring cup 55.

By reason of the vertical line of apertures 57 covered on the inside with the glass or transparent plate 59, the desired quantity of flour or meal can be quickly and accurately measured. The measuring cup 55 can be easily removed by simply lifting it from the loop on the end of the swinging arm 53.

Thus it will be seen we have constructed and formed a simple, compact and inexpensive kitchen cabinet, the same combining various features and parts in common use in the household and kitchen.

What we claim is—

1. In a kitchen cabinet, a flour bin or receptacle, comprising a tapered sheet metal vessel provided at its lower end with a spout, said vessel being swung upon exterior bearings at its lower ends and upon hangers connected by cross-rods located on the interior of said vessel, a sifting device located in the spout of said vessel, and a measuring cup swung beneath said spout.

2. In a kitchen cabinet, a flour bin or receptacle pivoted at its lower outside ends, a pair of hangers connected by cross-rods upon the interior of said receptacle thus forming an agitator for the flour, a spout depending from the lower end of the receptacle and covered by a portion of reticulated material, a shaker formed of a coil of wire and provided with a crank handle operating within said spout, and a measuring device swung immediately below said spout.

In testimony whereof we affix our signatures in presence of two witnesses.

ALFRED W. KRON MILLER.
GEORGE C. RUBY.

Witnesses to the signature of Alfred W. Kron Miller:
EVERETT C. WOLSER,
LENA BRATSCH.

Witnesses to the signature of Geo. C. Ruby:
MAUD GRIFFIN,
JNO. C. HIGDON.